May 27, 1924.
O. M. POLLOCK
TILTABLE HEADLIGHT
Filed Aug. 31, 1921
1,495,355
2 Sheets-Sheet 1
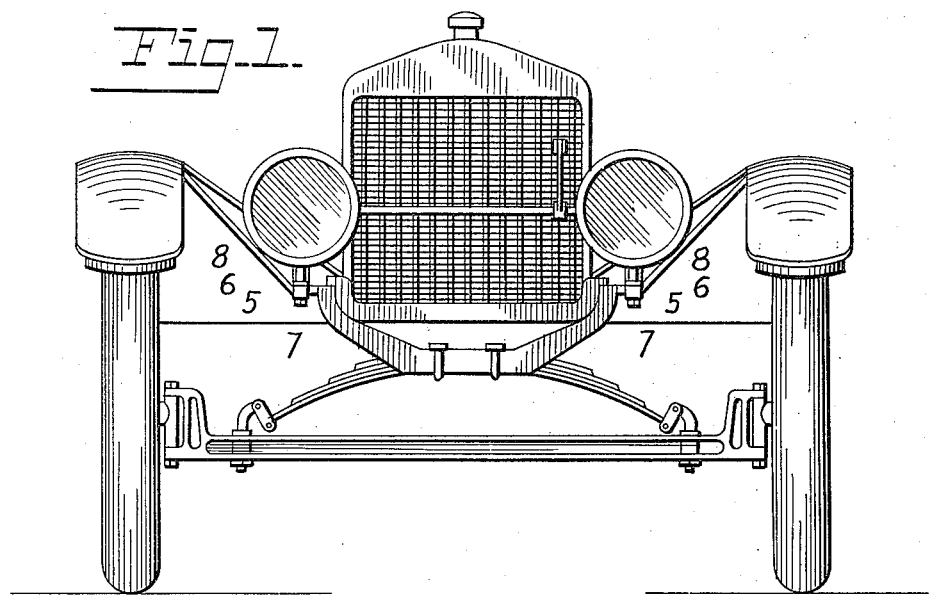
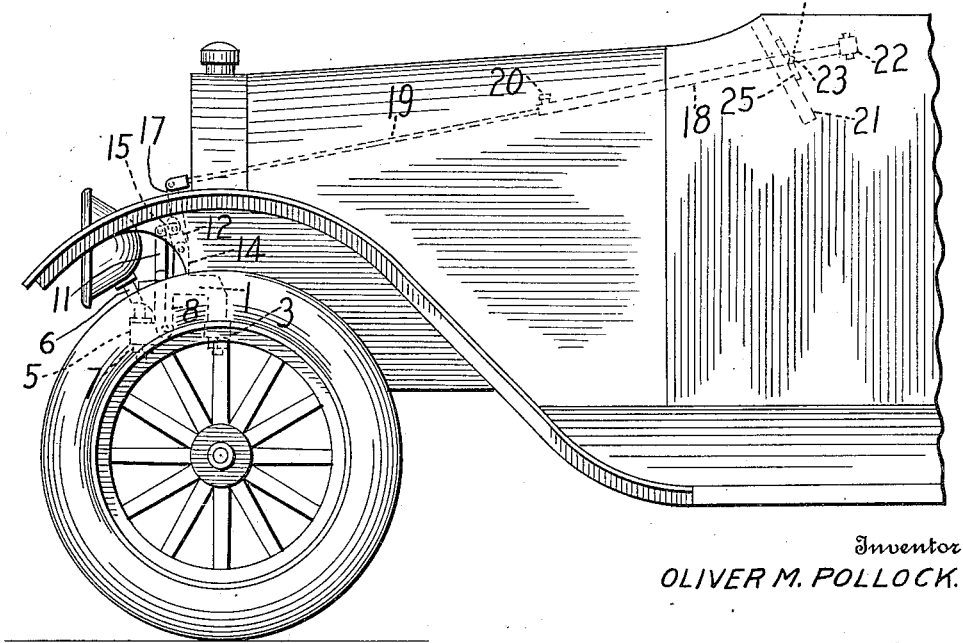
Inventor
OLIVER M. POLLOCK.
By Edward J. Reed
Attorney

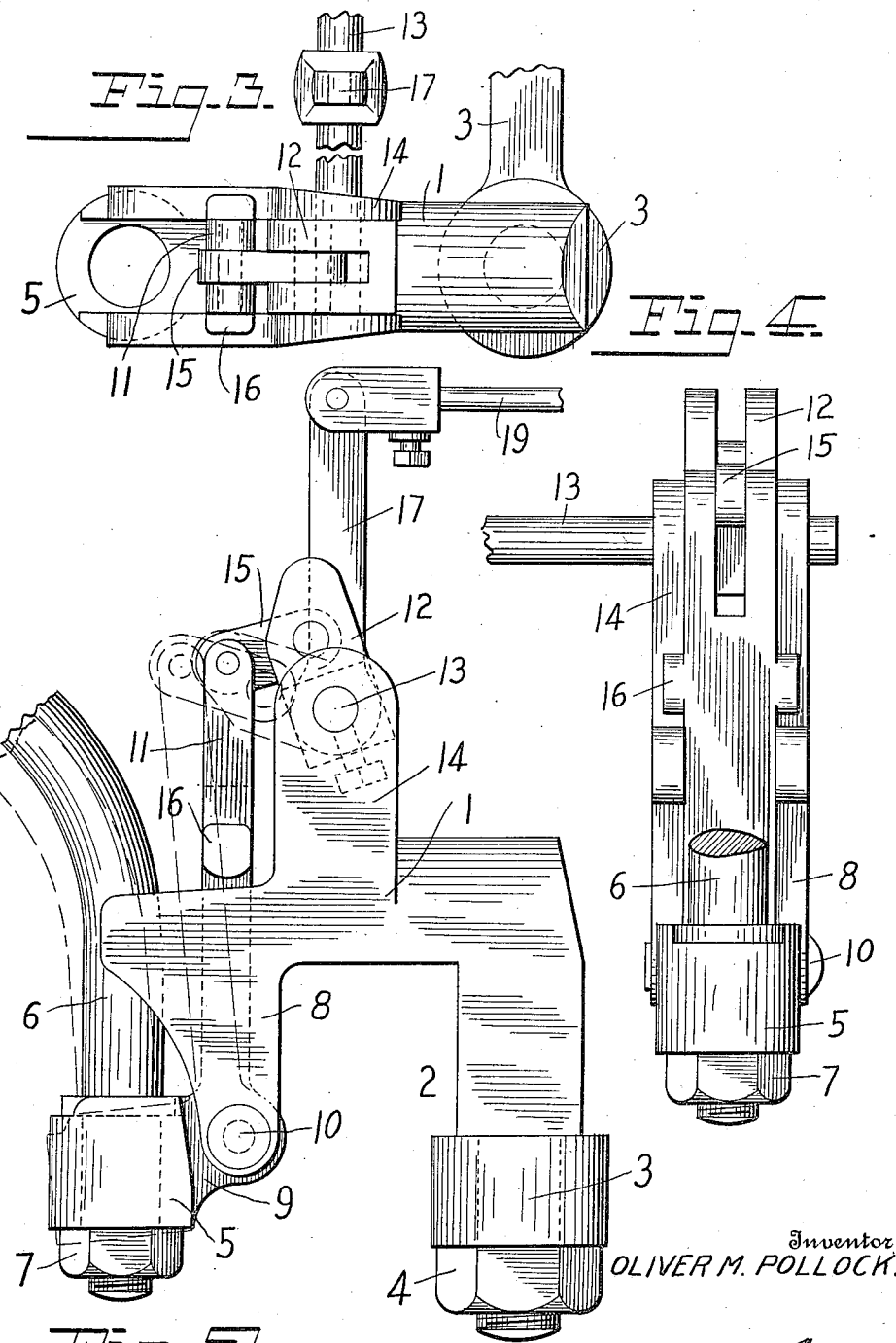

Patented May 27, 1924.

1,495,355

UNITED STATES PATENT OFFICE.

OLIVER M. POLLOCK, OF SPRINGFIELD, OHIO.

TILTABLE HEADLIGHT.

Application filed August 31, 1921. Serial No. 497,145.

*To all whom it may concern:*

Be it known that I, OLIVER M. POLLOCK, a citizen of the United States, residing at Springfield, in the county of Clark and State of Ohio, have invented certain new and useful Improvements in Tiltable Headlights, of which the following is a specification, reference being had therein to the accompanying drawing.

This invention relates to tiltable headlights for automobiles and the like.

One object of the invention is to provide a tiltable support for a head light which will be simple in construction, of a strong durable character and which can be easily applied to an automobile.

A further object of the invention is to provide a tiltable supporting device which can be interposed between the usual lamp and its supporting device without change in either part.

Other objects of the invention will appear as the device is described in detail.

In the accompanying drawings Fig. 1 is a front elevation of an automobile showing my invention applied thereto; Fig. 2 is a side elevation of the front portion of such an automobile; Fig. 3 is a plan view of one of the supporting devices; Fig. 4 is a front elevation of one of the supporting devices; and Fig. 5 is a side elevation of one of the supporting devices.

In carrying out my invention I provide a supplemental supporting device of such a character that the usual automobile lamp can be removed from its socket on the automobile, my supporting device mounted in that socket, and the lamp which has been removed from the original socket mounted on the supporting device. The socket in which the lamp is mounted is tiltable and a suitable actuating device is connected therewith which extends rearwardly to a point near the driver's seat from which it can be readily operated to control the position of the lamp. It will be understood, of course, that when the invention is applied to an automobile two supporting devices will be provided, one for each lamp, and that the tiltable lamp sockets will be so connected one with the other that they will be simultaneously operated.

In the present drawings I have illustrated one embodiment of my invention, which has been chosen for the purpose of illustration only. In this embodiment of the invention the supporting device comprises a bracket 1 having at its rear side a downwardly extending projection, or shank, 2, the lower end of which is adapted to fit within the socket 3 on the automobile, from which the lamp has been removed. The end of the shank extends through the socket and is provided with a nut 4 by means of which it is rigidly secured in position therein. Pivotally mounted on the forward side of the bracket 1 is a lamp socket 5 adapted to receive the bracket, or stem, 6 of the lamp which has been removed from the socket 3 of the automobile. This bracket, or stem, extends through the socket 5 and is provided with a nut 7 by means of which it is rigidly secured in position.

The lamp socket 5 may be mounted on the supporting bracket 1 in any suitable manner but as here shown the bracket is provided at its forward edge with depending ears 8 and the removable socket 5 is provided with a pivot lug 9 which extends between the lower ends of the ears 8 and is secured therein by a pivot pin or bolt 10. Rigidly secured to and preferably formed integral with the lug 9 is an actuating arm 11 which extends upwardly between the ears 8 and preferably fits snugly between the same so that it will be held against vibration or lateral strain, the ears being of such width that the arm 11 will lie between the same in all positions of the lamp. Connected with the upper end of the arm 11 is a suitable actuating device which, in the present instance, comprises a toggle consisting of an arm 12 rigidly secured to a shaft 13 which is journaled in a lug, or ear, 14 extending upwardly from the bracket 1. The toggle arm 12 has pivotally connected therewith a second arm, or link, 15, the forward end of which is pivotally connected with the upper end of the actuating arm 11. The link of the toggle and its arrangement are such that when the shaft 13 is rocked forwardly the toggle will be straightened and the lamp moved into and locked in its tilted position. If desired, the actuating arm 11 may be provided with laterally extending lugs 16 arranged above and adjacent to the upper edges of the ears 8 so that they will engage these ears and check the forward movement of the lamp in case the actuating device or toggle should be broken or disconnected from the arm 11.

Any suitable means may be provided for rocking the shaft 13 to move the lamp into and out of its tilted position. Where two lamps are employed I prefer to use a single shaft 13 for both lamps, this shaft being supported at its opposite ends in the lugs 14 of the respective supporting devices. Rigidly secured to the shaft 13 is a rock arm 17 which, in the present instance, is arranged between the two supporting devices and extends upwardly from the shaft. Pivotally connected with the arms 17 is an actuating rod 18 the forward portion of which, as shown at 19, is of relatively small diameter so that it may be passed through the radiator or through a small opening adjacent to the radiator. This small rod is preferably telescopically mounted in the main portion of the actuating rod 18 and is secured therein in adjusted positions by means of a screw 20, thereby enabling the length of the actuating rod as a whole to be adjusted. The rod 18 extends through an opening in the dash, or instrument board, 21 and is provided at its rear end with a handle 22 by means of which it may be manipulated. In the present construction the lamps are held in their tilted positions by the toggles on the operating devices, which are moved into their locking positions when the lamps are tilted, and other means are provided for locking the lamps in their upright positions. As here shown, the actuating rod is provided with a recess 23 so arranged that when the rod is in its rearmost position this recess will receive a pin 24 carried by a plate 25 secured to the instrument board 21 and through which the rod extends, the opening in the plate being sufficiently large to permit the rod to be moved into and out of engagement with the pin.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a supporting structure having a part adapted to be mounted in the lamp supporting socket of an automobile or the like, a lamp socket pivotally mounted on said supporting structure and adapted to receive the supporting bracket for the automobile lamp, an actuating device mounted on said supporting structure and operatively connected with said socket, and means for operating said actuating device to move said socket into and out of its tilted position.

2. In a device of the character described, a supporting structure comprising a part adapted to be mounted on an automobile or the like, a socket member pivotally mounted on said supporting structure for movement about a substantially horizontal axis and having a socket to receive the supporting bracket of an automobile lamp, an actuating device mounted on said supporting structure independently of said socket member and operatively connected with said socket member, and means for operating said actuating device.

3. In a device of the character described, a supporting structure having a part adapted to be mounted on an automobile or the like, a lamp socket pivotally mounted on said structure and adapted to receive the supporting bracket for the automobile lamp, an arm connected with said socket for moving the same into and out of a tilted position, a shaft mounted on said structure, an operative connection between said shaft and said arm, and means for rotating said shaft.

4. In a device of the character described, a supporting structure having a part adapted to be mounted on an automobile or the like, a lamp socket pivotally mounted on said structure, an arm connected with said lamp socket to move the same into and out of a tilted position, a shaft rotatably mounted on said supporting structure, a toggle connected with said shaft and said arm, and means for rotating said shaft.

5. In a device of the character described, a supporting structure having a part adapted to be mounted on an automobile or the like, a lamp socket pivotally mounted on said structure, an arm connected with said lamp socket to move the same into and out of a tilted position, a shaft rotatably mounted on said supporting structure, a toggle connected with said shaft and said arm, and means for rotating said shaft, said toggle being so arranged that it will be moved into its locking position when said lamp socket is in its tilted position.

6. In a device of the character described, a supporting structure having a part adapted to be mounted on an automobile or the like, a lamp socket pivotally mounted on said structure, an arm connected with said lamp socket to move the same into and out of a tilted position, a shaft rotatably mounted on said supporting structure, a toggle connected with said shaft and said arm, means for rotating said shaft, said toggle being so arranged that it will be moved into its locking position when said lamp socket is in its tilted position, an operating rod operatively connected with said shaft, and means for locking said rod in its retracted position.

7. In a device of the character described, a supporting structure having a part adapted to be mounted on an automobile or the like and having ears extending therefrom and spaced one from the other, a socket to receive the bracket for the lamp, a lug carried by said socket and pivotally mounted between said ears, an arm secured to said lug, extending upwardly and fitting snugly between said ears, a shaft mounted on said supporting structure, an operative connection between said shaft and said arm, and means for rotating said shaft.

8. In a device of the character described, a supporting structure having a part adapted to be mounted on an automobile or the like and having ears extending therefrom and spaced one from the other, a socket to receive the bracket for the lamp, a lug carried by said socket and pivotally mounted between said ears, an arm secured to said lug, extending upwardly and fitting snugly between said ears, a shaft mounted on said supporting structure, a toggle having one end rigidly secured to said shaft and the other end pivotally connected with said arm, a crank arm connected with said shaft, and means for imparting movement to said crank arm.

9. In a device of the character described, a supporting structure having a part adapted to be mounted on an automobile or the like and having ears extending therefrom and spaced one from the other, a socket to receive the bracket for the lamp, a lug carried by said socket and pivotally mounted between said ears, an arm secured to said lug, extending upwardly and fitting snugly between said ears, a shaft mounted on said supporting structure, an operative connection between said shaft and said arm, means for rotating said shaft, and a lug carried by said arm and arranged to engage the upper edge of one of said ears to limit the movement of said socket about its axis.

10. In a device of the character described, a pair of supporting brackets each having a shank adapted to be supported in the lamp socket of an automobile, a pair of ears extending forwardly from each of said brackets and spaced one from the other, a socket member having a lug pivotally mounted between said ears at the lower ends thereof, said socket being adapted to receive the bracket for an automobile lamp, an arm rigidly secured to said lug and extending upwardly between said ears, a shaft supported at its opposite ends on the respective brackets, toggles, each having one end rigidly secured to said shaft and its other end pivotally connected with one of said arms, an arm rigidly secured to said shaft, and an actuating rod connected with the last mentioned arm.

In testimony whereof, I affix my signature hereto.

OLIVER M. POLLOCK.